US012568366B2

(12) United States Patent
Rajadurai et al.

(10) Patent No.: US 12,568,366 B2
(45) Date of Patent: Mar. 3, 2026

(54) METHOD AND WIRELESS NETWORK FOR APPLICATION-SPECIFIC AUTHORIZATION FOR NETWORK SERVICES IN WIRELESS NETWORK

(71) Applicant: SAMSUNG ELECTRONICS CO., LTD., Suwon-si (KR)

(72) Inventors: Rajavelsamy Rajadurai, Bangalore (IN); Nivedya Parambath Sasi, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 18/056,650

(22) Filed: Nov. 17, 2022

(65) Prior Publication Data

US 2023/0164553 A1 May 25, 2023

(30) Foreign Application Priority Data

Nov. 19, 2021 (IN) .............................. 202141053378
Oct. 28, 2022 (IN) .............................. 202141053378

(51) Int. Cl.
*H04W 12/06* (2021.01)
*H04W 12/043* (2021.01)

(52) U.S. Cl.
CPC ......... *H04W 12/06* (2013.01); *H04W 12/043* (2021.01)

(58) Field of Classification Search
CPC ............................ H04W 12/06; H04W 12/043
See application file for complete search history.

(56) References Cited

U.S. PATENT DOCUMENTS

| | | | | |
|---|---|---|---|---|
| 10,306,432 B2 * | 5/2019 | Suh | ........................ | H04W 12/08 |
| 2011/0256850 A1 * | 10/2011 | Selander | ............... | H04L 63/101 |
| | | | | 455/411 |
| 2014/0141763 A1 * | 5/2014 | Suh | ..................... | H04L 41/0806 |
| | | | | 455/418 |

(Continued)

FOREIGN PATENT DOCUMENTS

| | | | | | |
|---|---|---|---|---|---|
| CN | 113225176 A | * | 8/2021 | .......... | H04L 63/061 |
| CN | 114071510 B | * | 3/2025 | ............ | H04W 76/11 |

(Continued)

OTHER PUBLICATIONS

3GPP TR 33.839, 3rd Generation Partnership Project (Year: 2021).*

(Continued)

*Primary Examiner* — Michael Pyzocha

(57) ABSTRACT

The disclosure relates to a 5G or 6G communication system for supporting a higher data transmission rate. Accordingly, embodiments herein disclose a method performed by an application function (AF) server, the method comprises receiving, from a terminal, a first request message including an user equipment (UE) service identifier (ID), transmitting, to an authorization server, a second request message for request association information of the terminal, the second request message including a terminal ID, receiving, from the authorization server, the association information of the terminal, in case that the association information is retrieved based on the terminal ID and performing to verify whether the UE service ID is associated with the terminal ID in the association information of the terminal.

20 Claims, 13 Drawing Sheets

S900

Configuring, by an network function entity, a mapping between service specific identifiers of the UE to provide access to the network services in the wireless network — S902

Receiving, by an application server, a service request from the UE to access the network services provided by the application server in the wireless network — S904

Authenticating, by the NF entity, least one identity (ID) of the UE before providing the access to the service request — S906

Verifying, by the NF entity, the mapping between service specific identifier in the service request with already authenticated ID of the UE to allow access to the network service provided by the application server in the wireless network — S908

(56) References Cited

U.S. PATENT DOCUMENTS

| | | | | |
|---|---|---|---|---|
| 2015/0133124 A1* | 5/2015 | Lim | H04W 48/08 | |
| | | | 455/436 | |
| 2019/0116179 A1* | 4/2019 | Xu | H04L 9/3226 | |
| 2019/0274086 A1* | 9/2019 | Cui | H04W 40/28 | |
| 2020/0359218 A1* | 11/2020 | Lee | H04M 15/55 | |
| 2021/0274345 A1* | 9/2021 | Wang | H04W 12/069 | |
| 2022/0109964 A1 | 4/2022 | Pattan et al. | | |
| 2023/0037031 A1* | 2/2023 | Wang | H04W 8/08 | |
| 2023/0164553 A1* | 5/2023 | Rajadurai | H04W 12/08 | |
| | | | 726/4 | |
| 2023/0354013 A1* | 11/2023 | Li | H04L 9/0844 | |
| 2024/0064510 A1* | 2/2024 | Karakoc | H04W 12/06 | |
| 2024/0098500 A1* | 3/2024 | Pateromichelakis | H04W 12/35 | |
| 2024/0276217 A1* | 8/2024 | Wang | H04L 9/0866 | |
| 2024/0298176 A1* | 9/2024 | Divvi | H04W 12/069 | |
| 2024/0349049 A1 | 10/2024 | Huang | | |
| 2024/0356742 A1* | 10/2024 | Tsiatsis | H04W 12/04 | |

FOREIGN PATENT DOCUMENTS

| | | | |
|---|---|---|---|
| JP | 2024530949 A | 8/2024 | |
| WO | 2020/226454 A1 | 11/2020 | |
| WO | 2021/138309 A1 | 7/2021 | |
| WO | 2023016420 A1 | 2/2023 | |

OTHER PUBLICATIONS

NPL Search History (Year: 2024).*

Khan, Mohsin et al., "AKMA: Delegated Authentication System of 5G", IEEE Communications Standards Magazine | Sep. 2021, pp. 56-61. (Year: 2021).*

Nguyen, Van-Linh et al., "Security and privacy for 6G: A survey on prospective technologies and challenges", arXiv:2108.11861v2 [cs. CR] Sep. 1, 2021, pp. 1-45. (Year: 2021).*

Khan, Mohsin et al., "Privacy Preserving AKMA in 5G", SSR'19: Proceedings of the 5th ACM Workshop on Security Standardisation Research Workshop pp. 45-56. (Year: 2019).*

M. Jones et al., "Internet Engineering Task Force (IETF)—JSON Web Signature (JWS)," ISSN: 2070-1721, RFC 7515, May 2015, 59 pages.

M. Jones et al., "Internet Engineering Task Force (IETF)—JSON Web Token (JWT)," ISSN: 2070-1721, RFC 7519, May 2015, 30 pages.

J. Richer, "Internet Engineering Task Force (IETF)—OAuth 2.0 Token Introspection," ISSN: 2070-1721, RFC 7662, Oct. 2015, 17 pages.

3GPP TS 23.434 V17.3.0 (Sep. 2021) Technical Specification; 3rd Generation Partnership Project; Technical Specification Group Services and System Aspects; Service Enabler Architecture Layer for Verticals (SEAL); Functional architecture and information flows; (Release 17); 181 pages.

3GPP TS 33.535 V17.4.0 (Dec. 2021) Technical Specification; 3rd Generation Partnership Project; Technical Specification Group Services and System Aspects; Authentication and Key Management for Applications (AKMA) based on 3GPP credentials in the 5G System (5GS) (Release 17); 24 pages.

3GPP TS 33.501 V16.9.0 (Dec. 2021); Technical Specification; 3rd Generation Partnership Project; Technical Specification Group Services and System Aspects; Security architecture and procedures for 5G system (Release 16); 257 pages.

International Search Report and Written Opinion of the International Searching Authority dated Feb. 23, 2023, in connection with International Application No. PCT/KR2022/017930, 7 pages.

3GPP TR 33.839 V0.8.0 (Oct. 2021) Technical Report; 3rd Generation Partnership Project; Technical Specification Group Services and System Aspects; Study on security aspects of enhancement of support for edge computing in the 5G Core (5GC) (Release 17); 80 pages.

Samsung, "Authentication and Authorization between 5GMSGS Client and MSGin5G server," 3GPP TSG-SA3 Meeting #101-e, S3-203239, e-meeting, Nov. 9-20, 2020, 3 pages.

Samsung, "CR to living document: Authorization of MSG client," 3GPP TSG-SA3 Meeting #105-e, S3-214220, e-meeting, Nov. 8-19, 2021, 2 pages.

Supplementary European Search Report dated Aug. 29, 2024, in connection with European Patent Application No. 22896005.0, 14 pages.

Examination report issued Sep. 24, 2024, in connection with Indian Patent Application No. 202141053378, 6 pages.

Samsung, "Authentication and authorization for MSGinSG UE," 3GPP TSG-SA3 Meeting #102-e. e-meeting, Jan. 2021, S3-210579 (Revision of S3-210455), 3 pages.

Samsung, "Authentication and Authorization between SGMSGS Client and MSGinSG server," 3GPP TSG-SA3 Meeting #101-e, e-meeting, Nov. 2020, S3-203365 (Revision of S3-203239), 3 pages.

3GPP TS 33.434 V16.2.0 (Mar. 2021), Technical Specification, 3rd Generation Partnership Project; Technical Specification Group Services and System Aspects; Security aspects of Service Enabler Architecture Layer (SEAL) for verticals; (Release 16); 24 pages.

Office Action dated Mar. 25, 2025, in connection with Japanese application No. 2024-524737, 12 pages.

"3rd Generation Partnership Project; Technical Specification Group Services and System Aspects; Study on security aspects of the message Service for MIoT over the 5G System (MSGin5G)", 3GPP TR 33.862 V0.7.0, Sep. 2021, 29 pages.

Office Action dated Jul. 11, 2025, in connection with Korean application No. 10-2024-7003986, 6 pages.

* cited by examiner

FIG. 9

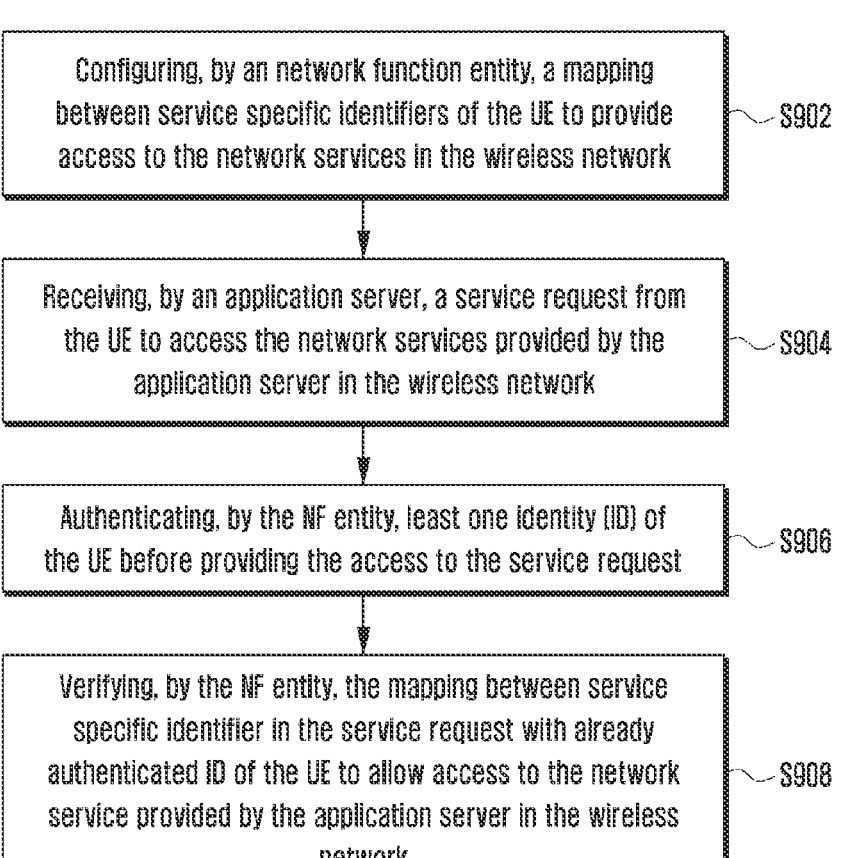

S900

Configuring, by an network function entity, a mapping between service specific identifiers of the UE to provide access to the network services in the wireless network — S902

Receiving, by an application server, a service request from the UE to access the network services provided by the application server in the wireless network — S904

Authenticating, by the NF entity, least one identity (ID) of the UE before providing the access to the service request — S906

Verifying, by the NF entity, the mapping between service specific identifier in the service request with already authenticated ID of the UE to allow access to the network service provided by the application server in the wireless network — S908

METHOD AND WIRELESS NETWORK FOR APPLICATION-SPECIFIC AUTHORIZATION FOR NETWORK SERVICES IN WIRELESS NETWORK

CROSS-REFERENCES TO RELATED APPLICATIONS

This application is based on and derives the benefit of Indian Provisional Application 202141053378 filed on Nov. 19, 2021, and Indian Non-Provisional Application 202141053378 filed on Oct. 28, 2022, the contents of which are incorporated herein by reference in their entirety.

BACKGROUND

1. Field

The present disclosure relates to a wireless communication, and more specifically related to a method and a wireless network for optimized application-specific authorization for a network service (e.g., fifth generation (5G) services or the like) in the wireless network. The present disclosure relates to an application-specific authorization for network services in a wireless communication network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Accordingly, embodiments herein disclose a method for application-specific authorization for network services in a wireless network. The method includes configuring, by a network function entity in the wireless network, a mapping between service specific identifiers of a user equipment (UE)

to provide access to the network services in the wireless network. Further, the method includes receiving, by an application server, a service request from the UE to access the network services provided by the application server in the wireless network. Further, the method includes authenticating, by the NF entity, least one identity (ID) of the UE (before providing the access to the service request). Further, the method includes verifying, by the NF entity, the mapping between service specific identifier in the service request with already authenticated ID of the UE to allow access to the network service provided by the application server in the wireless network.

In an embodiment, the service specific identifiers comprise a subscription permanent identifier (SUPI) of the UE, a generic public subscription identifier (GPSI), edge enabler client (EEC) identifier, a service identifier for the MSGin5G server, and a vertical application layer (VAL) user identifier (ID).

In an embodiment, the NF entity comprises an authentication server, wherein the authentication server comprises at least one of a unified data management (UDM) entity, an authentication, authorization and accounting (AAA) entity, an authentication server function (AUSF) entity, a conf management server, and a MSGin5G configuration function entity.

In an embodiment, the application server comprises at least one of an edge server, a MSGin5G server, a vehicle to everything (V2X) server, an unmanned aerial system (UAS) server, and a service enabler architecture layer (SEAL) server.

Accordingly, embodiments herein disclose a method for application-specific authorization for network services in a wireless network. The method includes sending, by a UE in the wireless network, a request to an application server in the wireless network to access the network service provided by the application server in the wireless network. Further, the method includes establishing, by the UE, a secured channel between the UE and the application server after a successful mutual authentication of at least one identity of the UE and the application server. Further, the method includes sending, by the UE, the service request to the application server through the secured channel. Further, the method includes including, by the UE, a service specific identifier or a UE specific identifier in the service request to the application server through the secured channel. Further, the method includes receiving, by the UE, a response message acknowledging a successful authorization for the requested service based on the included service specific identifier or the UE specific identifier by the application server. Further, the method includes accessing, by the UE, the network service from the application server.

Accordingly, embodiments herein disclose a method for application-specific authorization for network services in a wireless network. The method includes receiving, by an application server in the wireless network, a service request from a UE in the wireless network. Further, the method includes authenticating, by the application server, the UE ID included in a service request in response to receiving the service request. Further, the method includes establishing, by the application server, a secured channel between the UE and the application server after a successful mutual authentication. Further, the method includes sending, by the application server, a response message acknowledging a successful authentication and authorization of the UE by the application server. Further, the method includes providing, by the application server, the network service to the UE.

In an embodiment, the service request received from the UE is authorized based on a mapping between service specific identifiers of the UE configured by the authentication server in the wireless network.

Accordingly, embodiments herein disclose a wireless network for application-specific authorization for network services in the wireless network. The wireless network comprises a network function entity and an application server. The network function entity includes an application-specific authorization controller coupled to a memory and a processor. The application-specific authorization controller is configured to configure a mapping between service specific identifiers of a UE to provide access to the network services in the wireless network and store the mapping in the memory. The application server includes an application-specific authorization controller coupled to a memory and the processor.

The application-specific authorization controller of the application server is configured to receive a service request from the UE to access the network service provided by the application server in the wireless network and include the service specific identifier or a UE specific identifier in the service request to the application server through a secured channel. The application-specific authorization controller of the network function entity is configured to authenticate the UE before providing access to the network service provided by the application server in the wireless network. The application-specific authorization controller of the network function entity is configured to verify the mapping between service specific identifier in the request with an already authenticated ID of the UE to allow access to the network service provided by the application server in the wireless network.

Accordingly, embodiments herein disclose a UE for application-specific authorization for network services in a wireless network. The UE includes an application-specific authorization controller coupled to a memory and a processor. The application-specific authorization controller is configured to send a request to an application server in the wireless network to access the network service provided by the application server in the wireless network. Further, the application-specific authorization controller is configured to establish a secured channel between the UE and the application server after a successful mutual authentication of the UE by the application server.

Further, the application-specific authorization controller is configured to send the service request to the application server through the secured channel. Further, the application-specific authorization controller is configured to include a service specific identifier or a UE specific identifier in the service request to the application server through the secured channel. Further, the application-specific authorization controller is configured to receive a response message acknowledging a successful authorization for the requested service by the application server. Further, the application-specific authorization controller is configured to access the network service from the application server.

Accordingly, embodiments herein disclose an application server for application-specific authorization for network services in a wireless network. The application server includes an application-specific authorization controller coupled to a memory and a processor. The application-specific authorization controller is configured to receive a service request from a UE in the wireless network. Further, the application-specific authorization controller is configured to authenticate the UE ID included in the request in response to receiving the service request. Further, the application-specific authorization controller is configured to establish a secured channel between the UE and the application server (e.g., edge server or the MSGin5G server) after a successful mutual authentication. Further, the application-specific authorization controller is configured to send a response message acknowledging a successful authorization of the UE and the application server. Further, the application-specific authorization controller is configured to provide the network service to the UE.

The principal object of the embodiments herein is to provide a method and a wireless network for optimized application-specific authorization for 5G services in the wireless network.

Another object of the embodiment herein is to manage IDs of a UE to verify the authorization (validation of the association) of the UE when the UE requests for service access.

Another object of the embodiment herein is to provide associated IDs of a UE to an AF, while the AF is deployed inside or outside a PLMN to preserve a privacy.

Another object of the embodiment herein is to maintain the association/mapping of UE identifiers in an OAuth Server or authorization server or identity management server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which:

FIG. 9 illustrates a flow chart of a method for application-specific authorization for network services in the wireless network according to the embodiments as disclosed herein;

DETAILED DESCRIPTION

Figure 1:
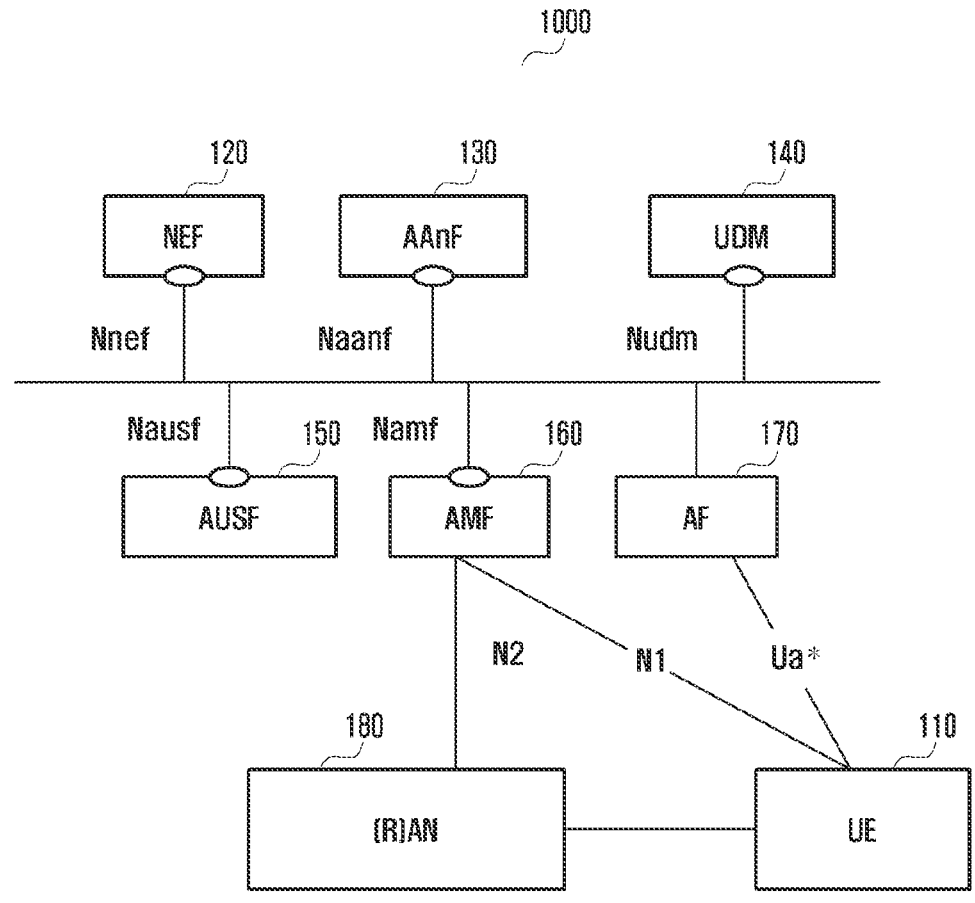
FIG. 1 illustrates a fundamental network model of AKMA, as well as the interfaces between the fundamental network model of AKMA according to a prior art.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "NF entity" and the "authentication server" are used interchangeably in the present disclosure. The terms "application server," "edge server," and "MSGin5G server" are used interchangeably in the present disclosure.

Accordingly, embodiments herein disclose a method for application-specific authorization for network services in a wireless network. The method includes configuring, by a network function entity in the wireless network, a mapping between service specific identifiers of a user equipment (UE) to provide access to the network services in the wireless network. Further, the method includes receiving, by an application server, a service request from the UE to access the network services provided by the application server in the wireless network. Further, the method includes authenticating, by the NF entity, least one identity (ID) of the UE (before providing the access to the service request). Further, the method includes verifying, by the NF entity, the mapping between service specific identifier in the service request with already authenticated ID of the UE to allow access to the network service provided by the application server in the wireless network.

In an embodiment, upon receiving the service access request message from the UE (with the application ID, for example UE service ID), the AF request the authorization server to provide the association information of the UE. The request message from the AF includes the authenticity verified identity (for example, SUPI of the UE, which is obtained after successful completion of AKMA).

The authorization server retrieves the association information using the SUPI of the UE and provides the association information to the AF. On receiving the association information, the AF verifies whether the application ID received in the service request is associated with the UE's authenticity verified identity in the association information. If the verification is successful, i.e., if the application ID received in the service request is associated with the UE's authenticity verified identity in the association information, then the AF provide access to the service. If the verification fails, i.e., if the application ID received in the service request is not associated with the UE's authenticity verified identity in the association information, then the AF denies access to the service. Application layer IDs assigned to the UE (or to the subscriber or to the User), to use application layer IDs to obtain service, are associated to one or more permanent ID (a unique permanently allocated global identity assigned by the MNO for example, SUPI, IMSI, IMPI, like so).

The provided method enables authorization between MSGin5G Client/VAL client and MSGin5G Server/VAL server, by using association information.

The provided method further enables verification of the UE request based on the UE specific identifier and/or service specific identifier sent in the service access request.

The provided method can be used for optimized application-specific authorization for 5G services. The method includes managing IDs of a UE to verify an authorization of the UE when the UE requests for service access. Further, the method includes providing the authorized IDs while AF is deployed inside or outside a public land mobile network. (PLMN). Further, the method includes maintaining the mapping of related identifiers in an OAuth server or authorization server, or ID management server.

For the present disclosure, in an embodiment, application layer IDs assigned to the UE (110) (or to the subscriber or to the User), to use application layer IDs to obtain service, are associated to one or more permanent ID (a unique permanently allocated global identity assigned by the MNO for example, SUPI, IMSI, IMPI, like so). If the authenticity of the permanent ID is verified by the network, then the network can validate/verify the association and allow/authorize the UE (110) to the obtain service using the associated application layer IDs.

The term "service request" and "registration request" are used interchangeably and means the initial message from the UE to the application server to access the service.

Figure 2A:
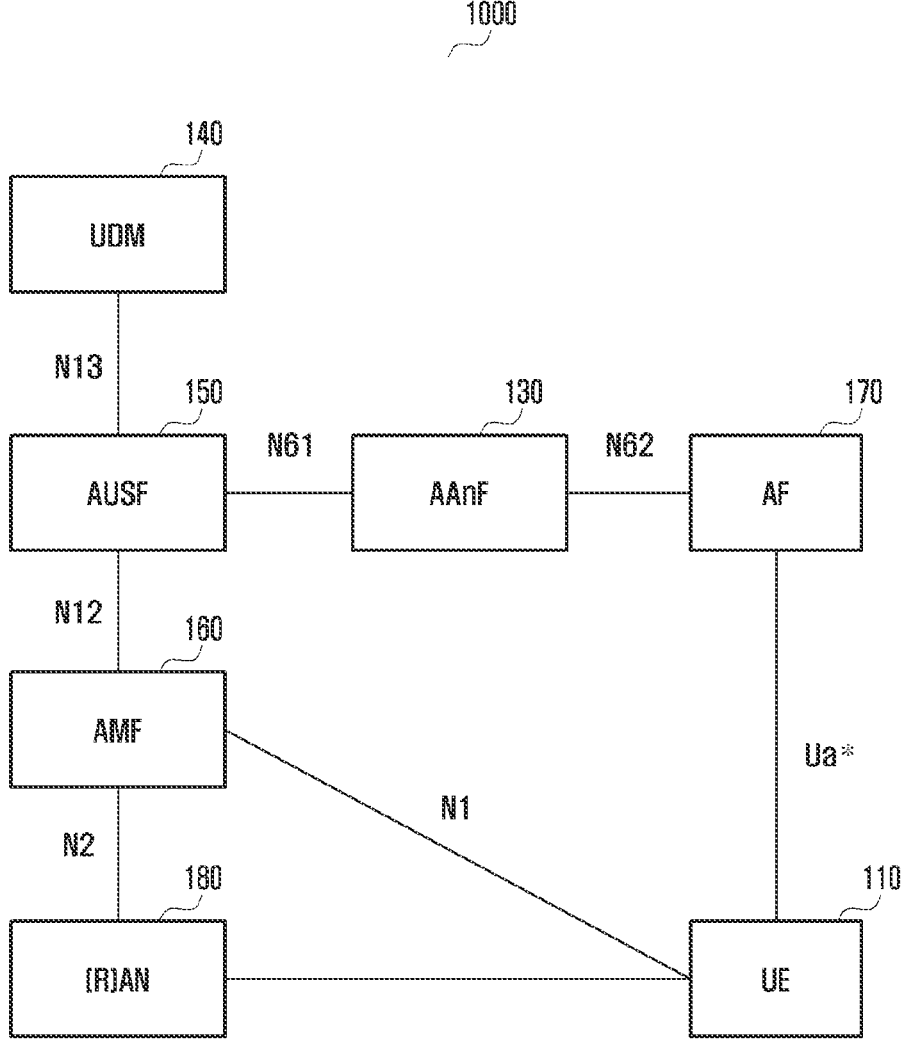
FIG. 2a illustrates an AKMA architecture using the reference point representation according to a prior art.
Figure 2B:
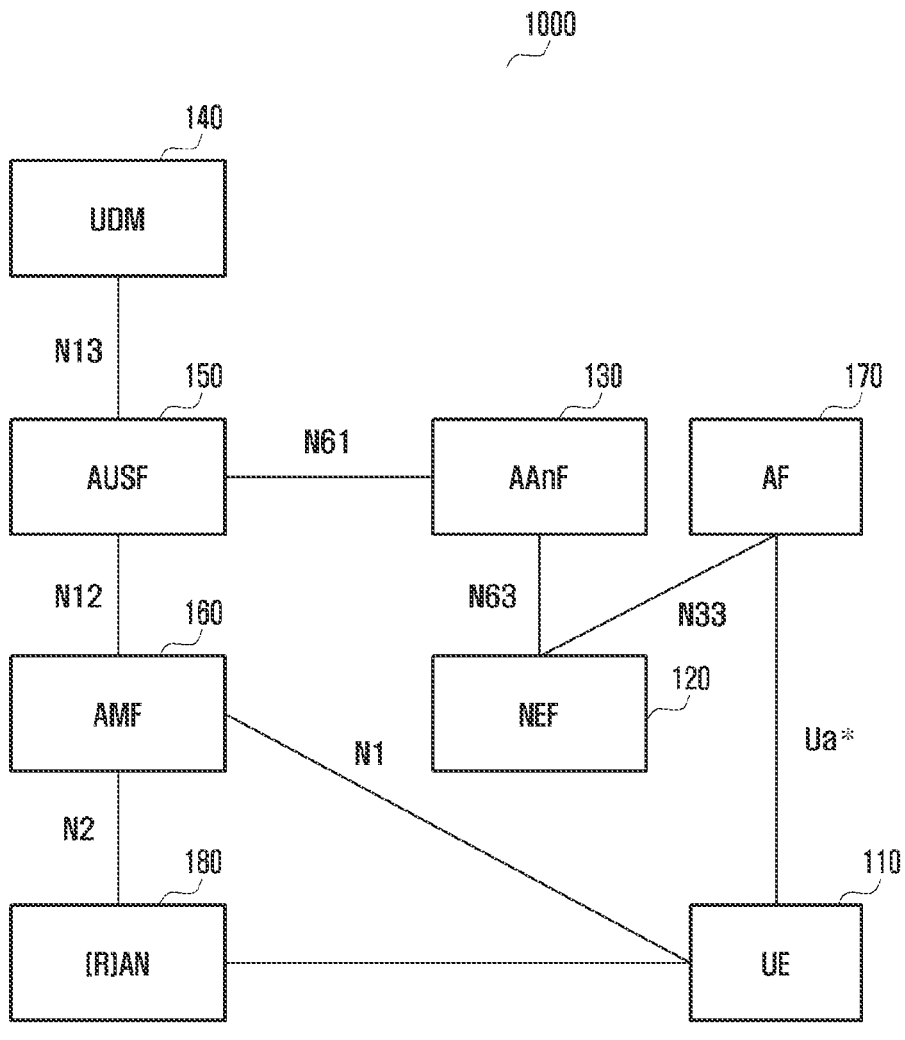
FIG. 2b illustrates an AKMA architecture using the reference point representation according to a prior art.

In general, the 3rd generation partnership project (3GPP) has defined security features and mechanisms to support authentication and key management aspects for applications based on subscription credential(s) in a 5G system as defined in TS 33.501. FIG. 1 illustrates a fundamental network model of authentication and key management for applications (AKMA), as well as interfaces between a fundamental network model of the AKMA, according to a prior art disclosed herein. FIG. 2a and FIG. 2b illustrate an AKMA architecture using the reference point representation according to a prior art;

The AKMA framework is being utilized for various services such as edge computing in 5GC (EDGE), proximity-based services (ProSe), MSGin5G service. Currently, the AKMA framework defines a static authorization where for an AF (170) (e.g., AKMA AF or the like) to authorize a UE (110) (e.g., for charging and/or service authorization purposes), a UE identifier needs to be provided to the AKMA AF. If the AKMA AF is in an operator network, the AKMA anchor function (AAnF) (130) provides a subscription permanent identifier (SUPI) to the AKMA AF directly. If the AKMA AF is outside the operator network, the AAnF (130) provides a SUPI to a network exposure function (NEF) (120). The NEF (120) translates SUPI to a generic public subscription identifier (GPSI) (external ID) and sends the GPSI to the AF out of the operator network. However, the authorization procedure provided by the AKMA framework is not enough to have service-specific authorization using service-specific identity. The issue with each use case is given below.

For an EDGE service, currently for authorization between an EDGE enabler client and an EDGE configuration server, static authorization is used.

Even with the authorization framework provided by the AKMA, it is not clear how the UE identifier could be associated or linked with the particular service and/or application and/or the EDGE enabler client.

The network does not store the EEC IDs, as it is not in the scope of the current art to handle the EEC ID or VAL ID as part of the subscription data.

For MSGin5G service, MSGin5G service utilizes a UE service ID (equivalent to VAL user ID in TS 23.434) during authentication and authorization. With the authorization framework provided by the AKMA it is not clear how the UE identifier could be associated or linked with the particular service and/or application and/or the MSG client.

As shown in FIG. 1, FIG. 2a and FIG. 2b, the AKMA anchor function (AAnF) (130) is deployed as a standalone function. Deployments can choose to collocate an AAnF (130) with an authentication server function (AUSF) (150) or with NEF (120) according to operators' deployment scenarios. The AKMA service requires a new logical entity, called the AKMA anchor function (AAnF) (130). The AAnF (130) is an anchor function in a Home PLMN HPLMN. The AAnF (130) stores the AKMA anchor key (KAKMA) and SUPI for AKMA service, which is received from the AUSF (150) after a UE (110) completes a successful 5G primary authentication. The AAnF (130) generates a key material to be used between the UE (110) and the application function (AF) (170) and maintains UE AKMA contexts. The AAnF (130) sends SUPI of the UE (110) to the AF (170) located inside the operator's network or the NEF (120).

The AF (170) is defined in TS 23.501 with additional functions. The AF (170) with the AKMA service enabling requests for AKMA application key, called KAF, from the AAnF (130) using A-KID. The AF (170) may be authenticated and authorized by the operator network before providing the KAF to the AF (170). The AF (170) located inside the operator's network performs the AAnF selection.

The NEF (120) is defined in TS 23.501 with additional functions. The NEF (120) enables and authorizes the external AF assessing AKMA service and forwards the request towards the AAnF (130). The NEF (120) performs the AAnF selection. The AUSF (150) is defined in TS 23.501 with additional functions. The AUSF (150) provides the SUPI and AKMA key material (A-KID, KAKMA) of the UE (110) to the AAnF (130). The AUSF (150) performs the AAnF selection. The UDM (140) is defined in TS 23.501 with the additional functions. The UDM (140) stores AKMA subscription data of the subscriber.

The following interfaces are involved in AKMA network architecture:

Nnef: Service-based interface exhibited by NEF (120),

Nudm: Service-based interface exhibited by UDM (140), and

Naanf: Service-based interface exhibited by AAnF (130).

The AKMA architecture reuses the following reference point from the 5GC for the execution of the primary authentication procedure:

N1: Reference point between the UE (110) and an Access and mobility management function (AMF) (160);

N2: Reference point between the (R)AN (180) and the AMF (160);

N12: Reference point between the AMF (160) and AUSF (150);

N13: Reference point between the UDM (140) and the AUSF (150); and

N33: Reference point between NEF (120) and an external AF.

The AKMA architecture defines the following reference points:

N61: Reference point between the AAnF (130) and the AUSF (150);

N62: Reference point between the AAnF (130) and an internal AF;

N63: Reference point between the AAnF (130) and NEF (120); and

Ua*: Reference point between the UE (110) and an AF (170).

Thus, it is desired to provide a useful alternative for optimized application-specific authorization (validation of the association) for 5G services.

Referring now to the drawings, and more particularly to FIGS. 3 through 12, there are shown preferred embodiments.

Figure 3:
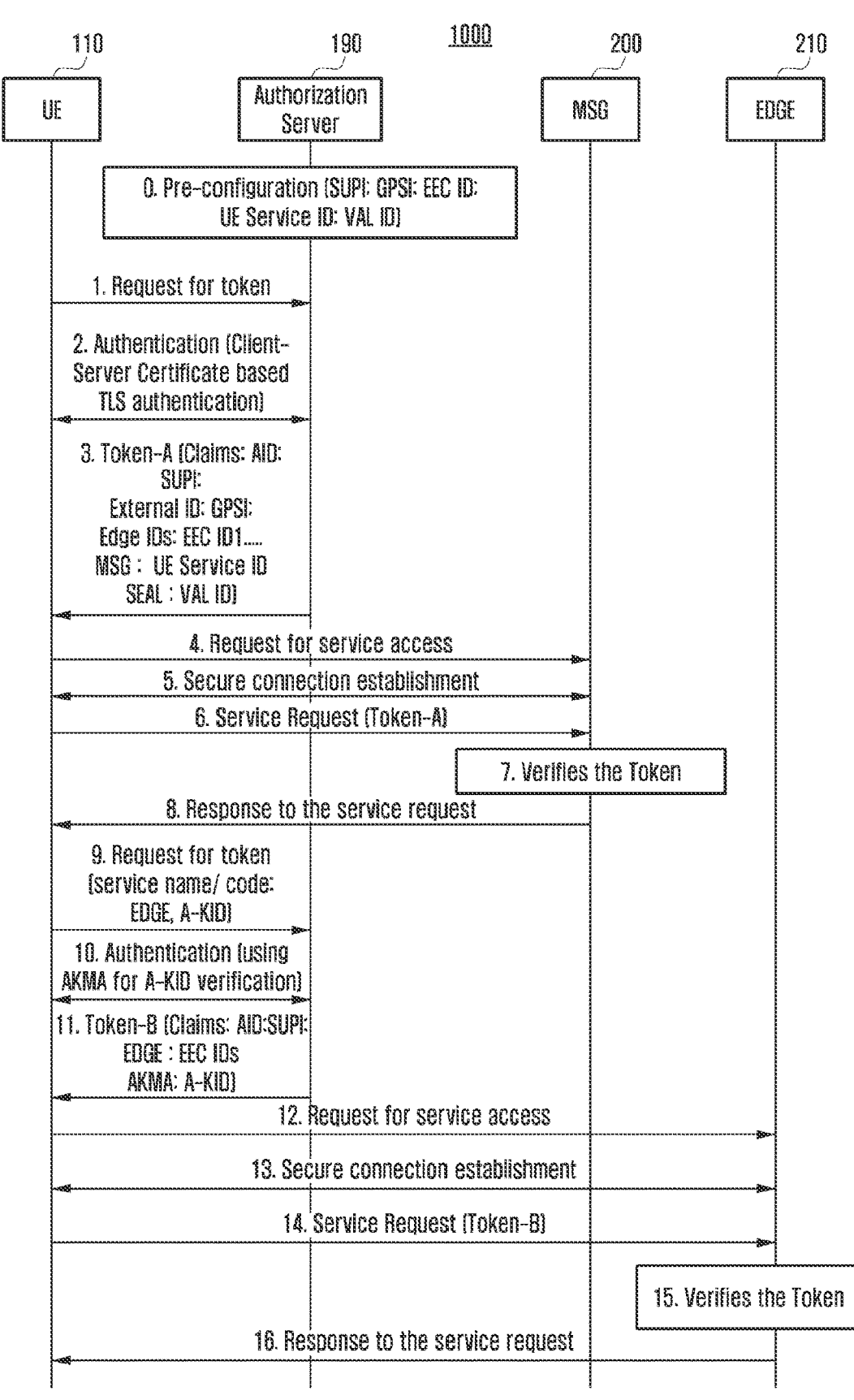
FIG. 3 illustrates a sequence flow diagram for a generalized method for authorization based on an access token between a UE and any AF, where the AF here refers to EDGE Server/MSGin5G server/any VAL server), according to an embodiment as disclosed herein.

FIG. 3 illustrates a sequence flow diagram of a generalized method for authorization between a UE (110) and any application function (AF) (170), according to an embodiment as disclosed herein. The AF (170) here refers to EDGE server (210)/MSGin5G server (200)/any VAL server like so).

At step-0, an authorization server (190) is pre-configured with the associated identities of the UE (mapping of/between) SUPI (globally unique 5G subscription permanent identifier of the UE): GPSI (external ID): EEC IDs (one or more EDGE client IDs): UE service ID (MSGin5G client ID): V2X service ID: CAA level UAV ID: VAL user ID (any VAL ID in case SEAL framework supported).

In an embodiment, for illustration propose the service specific Identifiers could be EEC ID (in case of EDGE) and/or a UE service ID (in case of MSGin5G service) and/or VAL user ID (for verticals utilizing SEAL enabler security framework) and/or the VAL service ID (for the VAL service) and/or the MSGin5G Service ID (for the MSGin5G services)

In another embodiment, GPSI could be the service specific identifier, where GPSI type indicates about the service it is being used for.

The term "client ID," "external ID," "service ID," "public ID," and "application ID" are used interchangeably throughout the present disclosure and means the identity used by the UE at the application layer to uniquely identify the client in the application provider domain. The mobile network operator (MNO) and/or the service/application provider (can be third-parties) is responsible for the assignment of the service/application identifier(s).

An OAuth server can be a third-party entity or an entity hosted by a mobile network operator. In an embodiment, the OAuth server could be an EDGE service provider (in case of EDGE) and/or an identity management server hosted by SEAL framework or MNO and/or an NRF as specified in TS 33.501 for service-based authorization between NF consumer and NF producer or/and a NEF (120) and/or authorization server (190) and/or AKMA anchor function (AAnF) (130) and/or AUSF (150).

In an embodiment, the identity mapping for the application is maintained only by the appropriate OAuth server, which means multiple entities maintain the corresponding association/binding of the subscription ID and the application ID in the network and the UE (application client) requests the appropriate OAuth server to provide the relevant token to obtain application access.

In another embodiment, in case AKMA or the service/application supports CAPIF framework, CAPIF core function can be an OAuth server.

In an embodiment, at step 1, the UE (110) requests the authorization server (190) to provide the access token, to access the service provided by the EDGE server (210) and/or MSGin5G server (200).

At step 2, based on the received request for an access token, the authorization server (190) initiates an authentication with the UE (110). Client-Server Certificate-based TLS authentication is used as illustrative purposes. The present disclosure does not limit the authentication method used between the UE (110) and the authorization server (190).

At step 3, on successful authentication, the authorization server (190) generates the access token based on the received request and the pre-configured association/mapping between SUPI (UE ID): GPSI (external ID): EEC ID (EDGE client ID): UE service ID (MSGin5G client ID): VAL user ID (any VAL ID in case SEAL framework supported): the VAL service ID (for the VAL service): MSGin5G Service ID (for the MSGin5G services): V2X service ID; CAA level UAV ID.

In an embodiment, the UE Service ID works as VAL user ID.

In another embodiment, the service identifier of MSGin5G service works as VAL service ID.

The access token (Token-A) includes service-specific claims i.e., association between SUPI (UE ID): GPSI (external ID): EEC ID (EDGE client ID): UE service ID (MSGin5G client ID): VAL user ID (any VAL ID in case SEAL framework supported). In an embodiment, this access token is utilized by the client to access services from EDGE, MSGin5G or any vertical services, if the token verification is successful at the server/network/service provider domain. The authorization server (190) sends the access token to the UE (110) in a response message. In an embodiment, the sequence of messages 1 to 3 could be interchanged, i.e., after successful authentication UE (110) requests for the token.

For illustrative purpose, if the UE (110) wants to access the MSGin5G Service, then the UE (110) sends a service request to the MSG server.

Before presenting the received access token (Token-A) to the MSG server, a secure channel is established between the UE (110) and the MSG server. TLS security tunnel based on the pre-shared key (PSK) could be one option. The authentication between the UE (110) and the MSG server (200) is fulfilled based on the TLS.

At step 4, on successful authentication (authenticity verification of the SUPI), the client initiates a service access request. The access token received from the authorization server (190) is sent in the request.

At step 5, The MSG server validates the access token (Token-A) based on the pre-configured mapping information available in local policy. In another embodiment, the authorization server (190) provides the token validation functionality and the MSG server utilize this service. In an embodiment, the MSG server verifies the request sent by the UE (110) against the (authorization) claims in the access token (verify whether the ID included in the request message is associated with the SUPI). More specifically, whether the client ID in the request is present in the token (that is whether there is mapping/association of the UE's SUPI with the client ID) of the UE (110) is mapped to the A-KID and/or SUPI and/or GPSI.

In another embodiment, the MSG server has a dedicated interface with the core network entity. MSG server reaches out to the UDM (140)/NRF/NEF (120)/AAnF (130)/AMF (160)/AUSF (150) to validate the access token received. In an embodiment, the UDM (140) stores the mapping information in the subscription data of each service. In another embodiment, NRF/NEF (120)/AAnF (130)/AMF (160)/AUSF (150) stores the mapping information (ID association of the UE) in its local policy.

After successful verification of the access token and authorization claims of the client (validation of the ID association), the MSG server sends a response message acknowledging the successful authorization of the MSG server.

In another embodiment, the UE (110) requests the authorization server (190) to provide the access token, to access the service provided by the EDGE server (210).

Based on the received request for access token including the A-KID and service name/code indicate the token request is for EDGE service, the authorization server (190) initiates authentication with the UE (110). The UE (110) registers in the 5G network and retrieves the information of AKMA capability from 5GC. The AKMA capability indicates that the AF (170) supports to use AKMA, thus the UE (110) and the 5GC generates KAKMA as specified in TS 33.535. AKMA service is used for illustrative purposes only. As an alternative to AKMA service, GBA can be used or Client-Server Certificate-based TLS authentication is used. The present disclosure does not limit the authentication method used between the UE (110) and authorization server (190). In another embodiment, the UE (110) uses a service name/Code. Service name/code could take the format as "EDGE," "MSGin5G," and "VAL service name" (where VAL refers to any vertical services like V2X etc.).

On successful authentication (authenticity verification of the A-KID and SUPI using AKMA service), the authorization server (190) generates the access token (Token-B) based on the received request and the pre-configured association/mapping between SUPI (UE ID): GPSI (external ID): EEC ID (EDGE client ID): A-KID (from AKMA): VAL service ID (for the VAL service): MSGin5G Service ID (for the MSGin5G service): V2X service ID: CAA level UAV ID.

In another embodiment, the UE service ID works as VAL user ID.

In another embodiment, the service identifier of MSGin5G service works as VAL service ID.

The access token (Token-B) includes only the service-specific claims i.e., mapping relevant to the EDGE service: association between SUPI (UE ID): GPSI (external ID): EEC ID (EDGE client ID): A-KID (from AKMA): VAL service ID (for the VAL service): MSGin5G Service ID (for the MSGin5G service). The authorization server (190) sends the access token to the UE (110) in a response message.

In an embodiment, the sequence of messages 9 to 11 could be interchanged, i.e., after successful authentication, the UE (110) requests for the token.

The UE (110) sends a service request to the EDGE server (210).

Before presenting the received access token (Token-B) to the EDGE server (210), a secure channel is established between the UE (110) and the EDGE server (210). TLS security tunnel based on the pre-shared key (application key generated as part of AKMA service) could be one option. The authentication between the UE (110) and the EDGE server (210) is fulfilled based on the TLS. On successful authentication, the client initiates a Service access request (incudes the application ID).

The access token (Token-B) received from the authorization server (190) is sent in the request.

The EDGE server (210) validates the access token (Token-B) based on the pre-configured security credentials (for example, the root certificate). In another embodiment, the authorization server (190) provides the token validation functionality and EDGE server (210) utilize the validation functionality. In an embodiment, the EDGE server (210) verifies the request sent by the UE (110) against the authorization claims in access token. More specifically, whether the client ID in the request is present in the token (that is whether there is mapping/association of the UE's SUPI with the Client ID) of the UE (110) is mapped to the A-KID and/or SUPI and/or GPSI and/or VAL service ID and/or MSGin5G service ID and/or UE service ID.

In another embodiment, the EDGE server (210) has a dedicated interface with the core network entity. MSG server reaches out to the UDM (140)/NRF/NEF (120) to validate the access token received. In an embodiment, the UDM (140) stores the mapping information in the subscription data of each service.

In another embodiment, NRF/NEF (120) stores the mapping information in its local policy.

After successful verification of the access token and authorization claims of the client, the EDGE server (210)

sends a response message acknowledging the successful authorization of the EDGE server (210).

Figure 4:
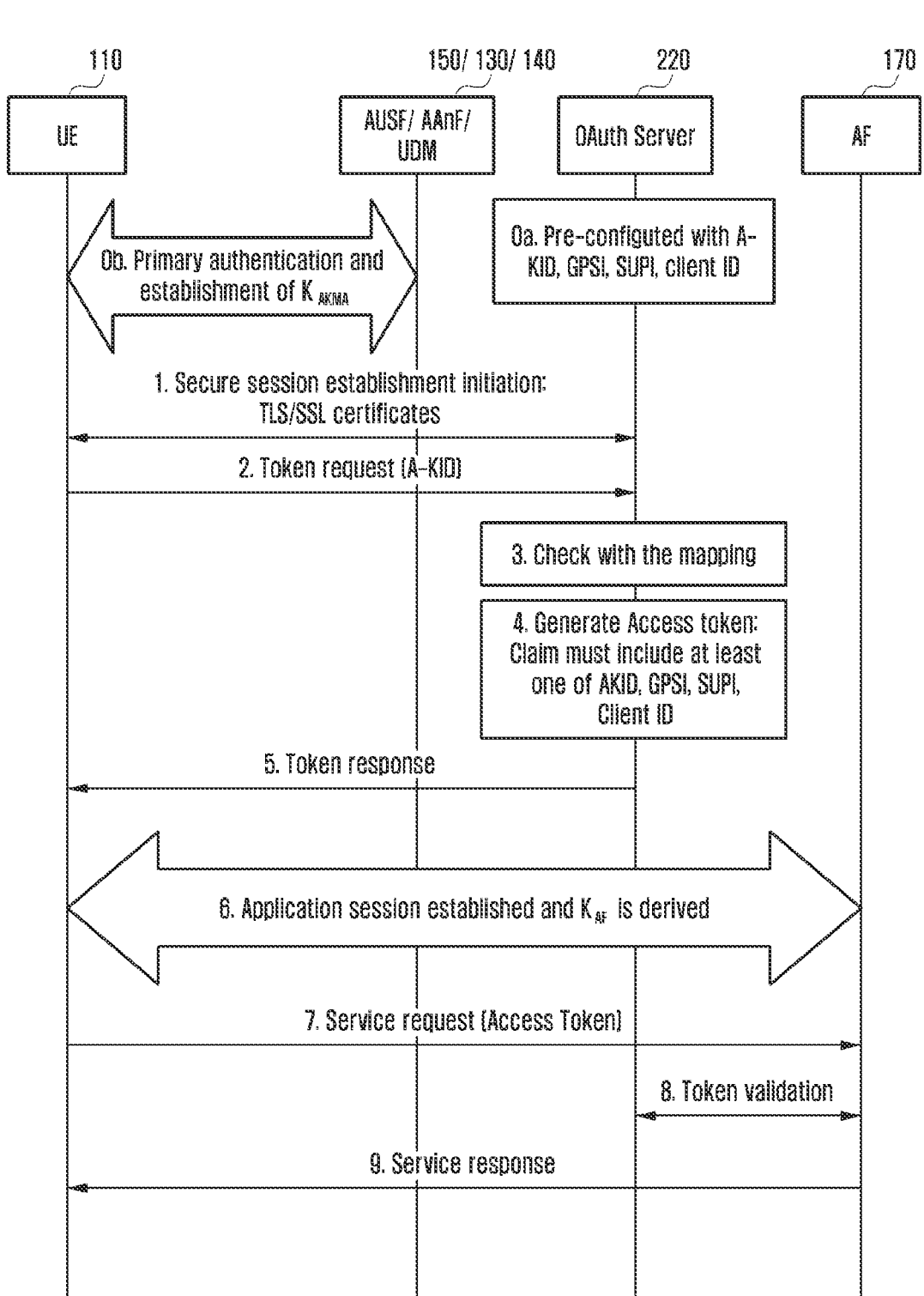
FIG. 4 illustrates a sequence flow diagram for authorization of the UE by providing an A-KID, when the AF is outside a PLMN hosted by an operator or a third party, according to an embodiment as disclosed herein.

FIG. 4 illustrates a sequence flow diagram when AF (170) is outside the PLMN hosted by an operator or third party according to an embodiment as disclosed herein.

At step-0, As a pre-requisite, it is required for the OAuth server to be pre-configured with the mapping between A-KID, SUPI, GPSI, and Client ID.

In an embodiment, for illustration provided, the client ID could an EEC ID (in case of EDGE) and/or a UE service ID (in case of MSGin5G service) and/or VAL user ID (for verticals utilizing SEAL enabler security framework).

The term "client ID," "external ID," and "application ID" are used interchangeably throughout the present disclosure and means the identity used by the UE (110) at the application layer to uniquely identify the client in the application provider domain.

An OAuth server can be a third-party entity or an entity hosted by the mobile network operator. In an embodiment, the OAuth server could be an EDGE service provider (in case of EDGE) and/or an Identity management server hosted by SEAL framework and/or an NRF as specified in TS 33.501 for service-based authorization between NF consumer and NF producer or/and a NEF (120) and/or authorization server (190).

In an embodiment, the ID mapping for the application is maintained only by the appropriate OAuth server, which means multiple entities maintain the corresponding binding of the subscription ID and the application ID in the network and the UE (application client) requests the appropriate OAuth server to provide the relevant token to obtain application access.

In another embodiment, in case AKMA or the service/application supports CAPIF framework, CAPIF Core Function can be an OAuth Server.

At 0b, the UE (110) registers in the 5G network and retrieves the information of AKMA capability from 5GC. The AKMA capability indicates that the AF (170) supports to use AKMA, thus the UE (110) and the 5GC generates KAKMA as specified in TS 33.535. AKMA service is used for illustrative purposes only. As an alternative to AKMA service, GBA can be used or Client-Server Certificate-based TLS authentication is used.

Mutual authentication based on client and server certificates established using TLS between the client and OAuth server is initiated.

After the successful establishment of TLS session, the client sends an Access Token Request message to the OAuth Server as per the OAuth 2.0 specification. In an embodiment, the request includes the A-KID derived as part of step 0b.

The OAuth server verifies the access token request as specified in OAuth 2.0 specification. In another embodiment, an OAuth server verifies the request based on the pre-configured mapping of A-KID with SUPI or GPSI, or Client ID. In an embodiment, before a client obtains an access token, it may be first registered with the OAuth server. In an embodiment, the client is issued a client identifier. The client identifier represents the client's registration with the OAuth server, and enables the OAuth server to reference parameters associated with that client's registration when being requested for an access token.

In an embodiment, the access token is generated by the OAuth server. The access token is opaque to the clients and is consumed by the application functions (i.e., EDGE configuration server, MSGin5G server (200), or any vertical application layer server). The access token can be encoded as a JSON Web token as defined in IETF RFC 7519. The access token includes the JSON web digital signature profile as defined in IETF RFC 7515. In an embodiment, it is provided to extend the standard claims defined in IETF RFC 7662 with the additional claims shown in below TABLE 1.

TABLE 1

| Parameters and descriptions | |
| --- | --- |
| Parameter | Description |
| Service Profile | REQUIRED for Client consuming the service resource from the AP. The service profile includes A-KID mapping with at least one of SUPI, GPSI, Client ID, service ID. |
| A-KID | REQUIRED for Client consuming the service resource from the AP. Includes A-KID mapping with at least one of SUPI, GPSI, Client ID, service ID. |

The OAuth server sends the access token generated in a token response message.

The UE (110) initiates an application session establishment procedure. The UE (110) communicates with the AF (170) to negotiate the key KAF, of which the UE and the AF (170) both are in possession. The UE (110) and the AF (170) establishes the TLS security tunnel based on the key KAF. The authentication between the UE (110) and the AF (170) is fulfilled based on the TLS.

On successful authentication, the client initiates a service access request. The access token received from the OAuth server is sent in the request.

The AF (170) validates the access token based on the received SUPI or GPSI from AAnF (130). In another embodiment, the OAuth server provides the token validation functionality. In an embodiment, the AF (170) verifies the request sent by the Client against the authorization claims in the access token. More specifically, whether the client ID in the request is present in the token (that is whether there is mapping of the UE's SUPI with the Client ID) of the UE (110) is mapped to the A-KID and/or SUPI and/or GPSI.

After successful verification of the access token and authorization claims of the client, the AF (170) sends a response message acknowledging the successful authorization of the AF (170).

Figure 5:
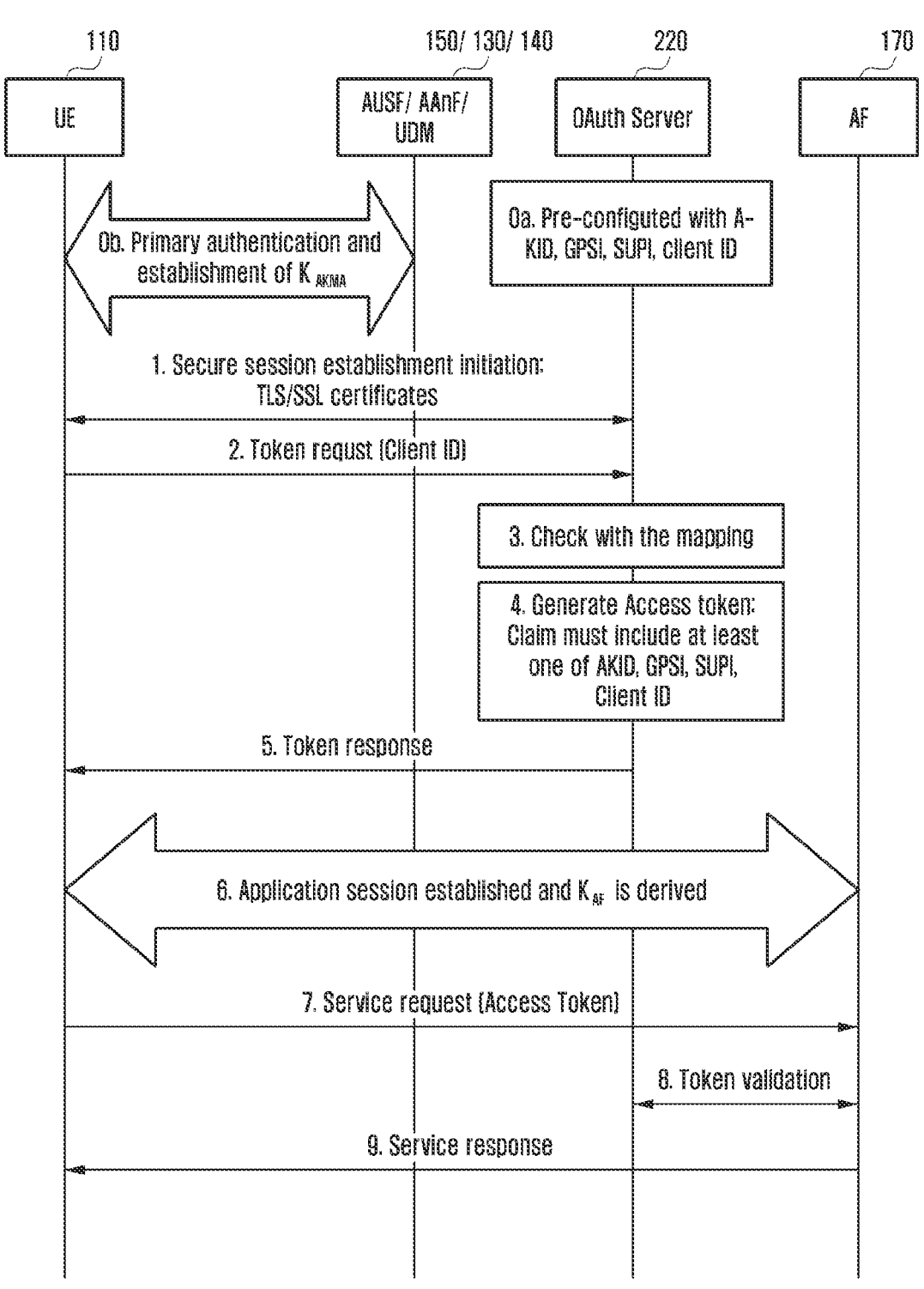
FIG. 5 illustrates a sequence flow diagram for authorization of the UE by providing an A-KID, when AF is hosted inside PLMN i.e., in operator domain, according to an embodiment as disclosed herein.

FIG. 5 illustrates a sequence flow diagram when AF (170) in hosted inside PLMN i.e., in operator domain according to an embodiment as disclosed herein.

At step-0a, As a pre-requisite, it is required for the OAuth server to be pre-configured with the mapping between A-KID, SUPI, GPSI and Client ID.

In an embodiment, the client ID could an EEC ID (in case of EDGE) or a UE service ID (in case of MSGin5G service) or VAL user ID (for verticals utilizing SEAL enabler security framework).

In an embodiment, the UE service ID works as VAL user ID.

In another embodiment, the service identifier of MSGin5G service works as VAL service ID;

An OAuth server can be a third-party entity or an entity hosted by operator's network. In an embodiment, the OAuth server could be an EDGE service provider (In case of EDGE) or an identity management server hosted by SEAL framework or an NRF as specified in TS 33.501 for service based authorization between NF consumer and NF producer.

In another embodiment, in case AKMA or the service/ application supports CAPIF framework, CAPIF core function can be an OAuth server.

At step-0b, the UE (110) registers in the 5G network, and retrieves the information of AKMA capability from 5GC. The AKMA capability indicates that the AF (170) supports to use AKMA, thus the UE (110) and the 5GC generates KAKMA as specified in TS 33.535. AKMA service is used for illustrative purpose only. As an alternative to AKMA service, GBA can be used or Client-Server Certificate based TLS authentication is used.

Mutual authentication based on client and server certificates established using TLS between the client and OAuth server is initiated.

After successful establishment of TLS session, the client sends an access token request message to the OAuth server as per the OAuth 2.0 specification. In an embodiment, the request includes the client ID. In an embodiment, before a client obtains an access tokens, it may be first registered with the OAuth server. In an embodiment, the client is issued a client identifier with the means not specified in the present disclosure. The client identifier represents the client's registration with the OAuth server, and enables the OAuth server to reference parameters associated with that client's registration when being requested for an access token.

The OAuth server verifies the access token request as specified in OAuth 2.0 specification. In another embodiment, an OAuth server verifies the request based on the pre-configured mapping of client ID with SUPI or GPSI.

In an embodiment, the access token generated by the OAuth server. The access token is opaque to the clients and is consumed by the application functions (i.e., EDGE configuration server, MSGin5G server (200) or any vertical application layer server). The access token can be encoded as a JSON Web Token as defined in IETF RFC 7519. The access token includes the JSON web digital signature profile as defined in IETF RFC 7515. In an embodiment, it is provided to extend the standard claims defined in IETF RFC 7662 with the additional claims shown in below TABLE 2.

TABLE 2

| Parameters and description | |
| --- | --- |
| Parameter | Description |
| Service Profile | REQUIRED for Client consuming the service resource from the AP. The service profile includes Client ID/service ID mapping with at least one of SUPI, GPSI. |

The OAuth server sends the access token generated in a token response message.

The UE (110) initiates an application session establishment procedure. The UE (110) communicates with the AF (170) to negotiate the key KAF, of which the UE and the AF (170) both are in possession. The UE (110) and the AF (170) establishes the TLS security tunnel based on the key KAF. The authentication between the UE (110) and the AF (170) is fulfilled based on the TLS.

On successful authentication, the client initiates a service access request. The access token received from the OAuth server is sent in the request.

The AF (170) validates the access token based on the received SUPI or GPSI from AAnF (130). In another embodiment, the OAuth server provides the token validation functionality. In an embodiment, the AF (170) verifies the request sent by client against the authorization claims in access token, if the AF (170) possess the necessary credentials to verify the token (for example, root certificate).

After successful verification of the access token and authorization claims of the client, the AF (170) sends a response message acknowledging the successful authorization of the AF (170) to the UE (110).

In an embodiment, for privacy preservation, if the AF (170) is located outside the PLMN, then the token-B may not contain the permanent IDs (for e.g., SUPI), the token claims contains only the temporary IDs like A-KID and the associated application IDs (GPSI (external ID): EEC ID (EDGE client ID)), VAL user ID.

In an embodiment, the information whether the AF (170) is located outside or inside of the PLMN is identified by the OAuth server using the service code or based on the AF ID (provided by the client in the token request message) or based on the application ID.

In an embodiment, the validation of the associated ID using token is performed if the AF (170) is located outside the PLMN. In this case, the token claim does not include the permanent IDs (for example, SUPI), but the associated application IDs (for example, GPSI) and authenticity verified ID (for example, A-KID) of the UEs. The AF (170) which needs to verify the associated IDs, request the authorization server (190) to verify the claims in the token. The authorization server (190) retrieve the ID association information using authenticity verified identity (for example, A-KID).

In an embodiment, the validation of the associated ID is performed using association information, if the AF (170) is located inside the PLMN. In this case, the association information is provided by the authorization server (190) to the AF (170), so that AF server verifies the validity of the association in the service request message. Upon receiving the service access request message from the UE (110) (with the application ID, for example UE service ID), the AF (170) request the authorization server (190) to provide the association information of the UE (110). The request message from the AF (170) includes the authenticity verified identity (for example, SUPI of the UE, which is obtained after successful completion of AKMA).

The authorization server (190) retrieves the association information using the SUPI of the UE (110) and provides the association information to the AF (170). On receiving the association information, the AF (170) verifies whether the application ID received in the service request is associated with the UE's authenticity verified identity in the association information. If the verification is successful, i.e., if the application ID received in the service request is associated with the UE's authenticity verified identity in the association information, then the AF (170) provide access to the service. If the verification fails, i.e., if the application ID received in the service request is not associated with the UE's authenticity verified identity in the association information, then the AF (170) denies access to the service.

Figure 6:
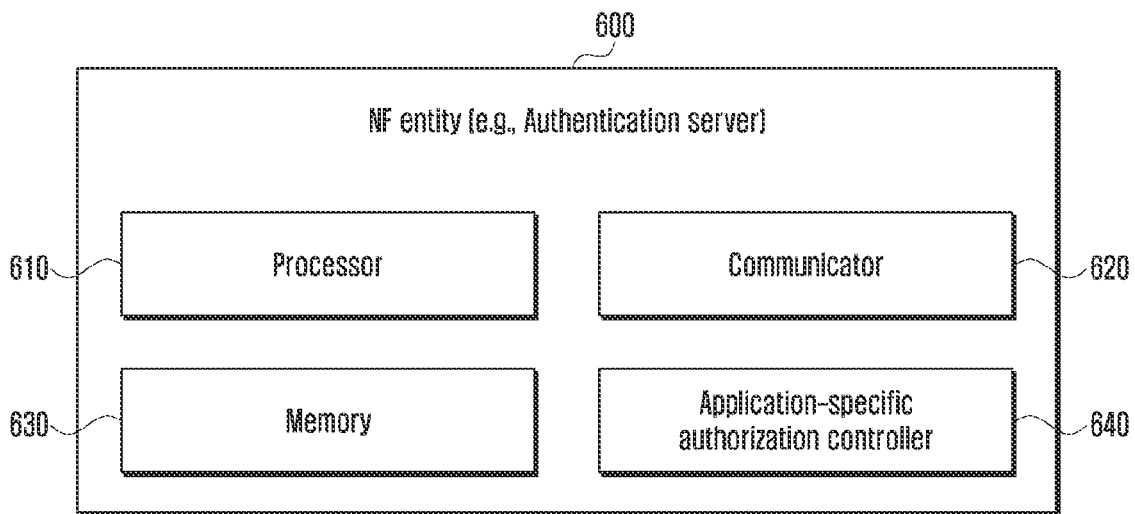
FIG. 6 illustrates various hardware components of a NF entity (e.g., authentication server) according to the embodiments as disclosed herein.

FIG. 6 illustrates various hardware components of the NF entity or the authentication server (600) according to the embodiments as disclosed herein. The authentication server (600) can be, for example, but not limited to the UDM entity, an AAA entity, an AUSF entity, a Conf Management server, and a MSGin5G Configuration Function entity. In an embodiment, the authentication server (600) includes a processor (610), a communicator (620), a memory (630) and an application-specific authorization controller (640). The processor (610) is coupled with the communicator (620), the memory (630) and the application-specific authorization controller (640).

The application-specific authorization controller (640) configures the mapping between the service specific identifiers of the UE (110) to provide access to the network services in the wireless network (1000) and store the mapping in the memory (630). Further, the application-specific authorization controller (640) authenticates the UE (110) before providing access to the network service provided by the application server in the wireless network (1000) as the application server receives the service request from the UE (110) to access the network services provided by the application server in the wireless network. The application-specific authorization controller (640) verifies the mapping between service specific identifier in the request with the already authenticated ID of the UE (110) to allow access to the network service provided by the application server in the wireless network (1000).

The application-specific authorization controller (640) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (610) is configured to execute instructions stored in the memory (630) and to perform various processes. The communicator (620) is configured for communicating internally between internal hardware components and with external devices via one or more networks. The memory (630) also stores instructions to be executed by the processor (610). The memory (630) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (630) may, in some examples, be considered a non-transitory storage medium. The term "non-transitory" may indicate that the storage medium is not embodied in a carrier wave or a propagated signal. However, the term "non-transitory" should not be interpreted that the memory (630) is non-movable. In certain examples, a non-transitory storage medium may store data that can, over time, change (e.g., in random access memory (RAM) or cache).

Although the FIG. 6 shows various hardware components of the authentication server (600) but it is to be understood that other embodiments are not limited thereon. In other embodiments, the authentication server (600) may include less or more number of components. Further, the labels or names of the components are used only for illustrative purpose and does not limit the scope of the present disclosure. One or more components can be combined together to perform same or substantially similar function in the authentication server (600).

Figure 7:
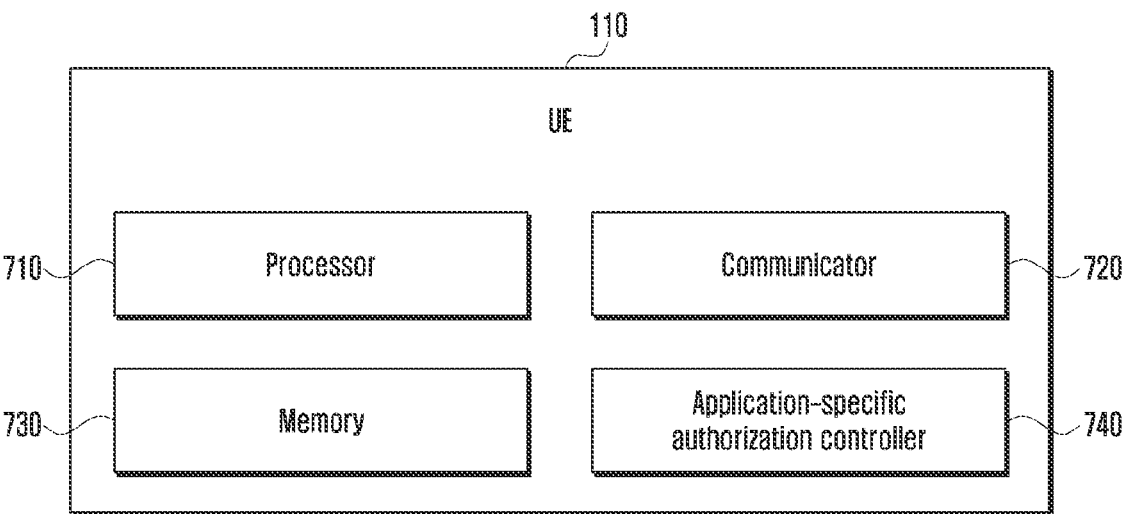
FIG. 7 illustrates various hardware components of the UE according to the embodiments as disclosed herein.

FIG. 7 illustrates various hardware components of the UE (110) according to the embodiments as disclosed herein. In an embodiment, the UE (110) includes a processor (710), a communicator (720), a memory (730) and an application-specific authorization controller (740). The processor (710) is coupled with the communicator (720), the memory (730) and the application-specific authorization controller (740).

The application-specific authorization controller (740) sends the request to the application server in the wireless network (1000) to access the network service provided by the application server in the wireless network. Further, the application-specific authorization controller (740) establishes the secured channel between the UE (110) and the application server after the successful mutual authentication of the UE (110) by the application server. Further, the application-specific authorization controller (740) sends the service request to the application server through the secured channel. Further, the application-specific authorization controller (740) includes the service specific identifier or the UE specific identifier in the service request to the application server through the secured channel. Further, the application-specific authorization controller (740) receives the response message acknowledging a successful authorization for the requested service by the application server. Further, the application-specific authorization controller (740) accesses the network service from the application server.

The application-specific authorization controller (740) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (710) is configured to execute instructions stored in the memory (730) and to perform various processes. The communicator (720) is configured for communicating internally between internal hardware components and with external devices via one or more networks. The memory (730) also stores instructions to be executed by the processor (710). The memory (730) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (730) may, in some examples, be considered a non-transitory storage medium. The term "non-transitory" may indicate that the storage medium is not embodied in a carrier wave or a propagated signal. However, the term "non-transitory" should not be interpreted that the memory (730) is non-movable. In certain examples, a non-transitory storage medium may store data that can, over time, change (e.g., in random access memory (RAM) or cache).

Although the FIG. 7 shows various hardware components of the UE (110) but it is to be understood that other embodiments are not limited thereon. In other embodiments, the UE (110) may include less or more number of components. Further, the labels or names of the components are used only for illustrative purpose and does not limit the scope of the present disclosure. One or more components can be combined together to perform same or substantially similar function in the UE (110).

Figure 8:
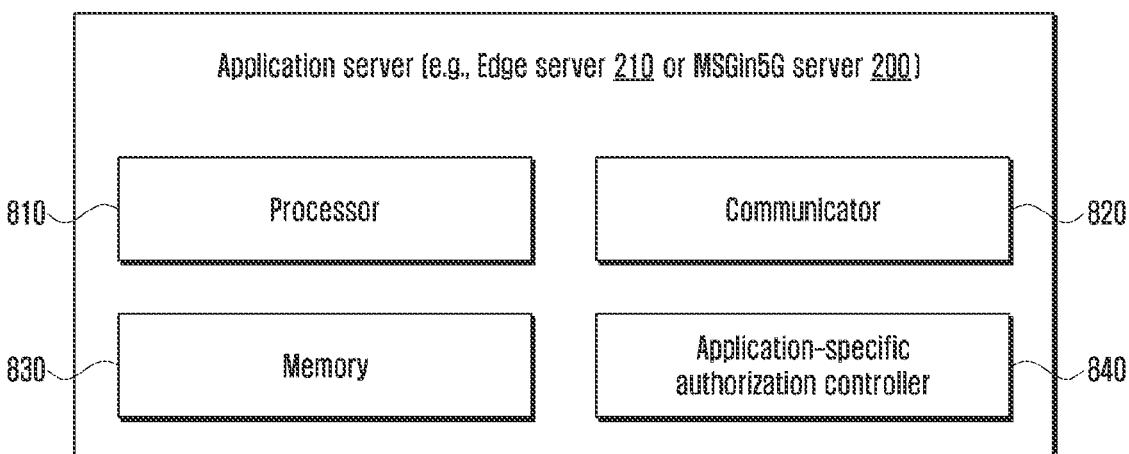
FIG. 8 illustrates various hardware components of an application server (e.g., edge server or a MSGin5G server) according to the embodiments as disclosed herein.

FIG. 8 illustrates various hardware components of the application server (e.g., edge server (210) or the MSGin5G server (200)) according to the embodiments as disclosed herein. The application server can be, for example, but not limited to the edge server, the MSGin5G server, the V2X server, the UAS server, and the SEAL server. In an embodiment, the edge server (210) or the MSGin5G server (200) includes a processor (810), a communicator (820), a memory (830) and an application-specific authorization controller (840). The processor (810) is coupled with the communicator (820), the memory (830) and the application-specific authorization controller (840).

The application-specific authorization controller (840) receives the service request from the UE (110) in the wireless network (1000). Further, the application-specific authorization controller (840) authenticates the UE ID included in the request in response to receiving the service request. Further, the application-specific authorization controller (840) establishes a secured channel between the UE (110) and the application server after a successful mutual authentication. Further, the application-specific authorization controller (840) sends the response message acknowledging a successful authorization of the UE (110) and the application server. Further, the application-specific authorization controller (840) provide s the network service to the UE (110).

The application-specific authorization controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (810) is configured to execute instructions stored in the memory (830) and to perform various processes. The communicator (820) is configured for communicating internally between internal hardware components and with external devices via one or more networks. The memory (830) also stores instructions to be executed by the processor (810). The memory (830) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (830) may, in some examples, be considered a non-transitory storage medium. The term "non-transitory" may indicate that the storage medium is not embodied in a carrier wave or a propagated signal. However, the term "non-transitory" should not be interpreted that the memory (830) is non-movable. In certain examples, a non-transitory storage medium may store data that can, over time, change (e.g., in random access memory (RAM) or cache).

Although the FIG. 8 illustrates various hardware components of the edge server (210) or the MSGin5G server (200) but it is to be understood that other embodiments are not limited thereon. In other embodiments, the edge server (210) or the MSGin5G server (200) may include less or more number of components. Further, the labels or names of the components are used only for illustrative purpose and does not limit the scope of the present disclosure. One or more components can be combined together to perform same or substantially similar function in the edge server (210) or the MSGin5G server (200).

FIG. 9 illustrates a flow chart (S900) of a method for the application-specific authorization for network services in the wireless network (1000) according to the embodiments as disclosed herein.

At S902, the method includes configuring, by the network function entity (600), a mapping between service specific identifiers of the UE to provide access to the network services in the wireless network. At S904, the method includes receiving, by the application server, the service request from the UE (110) to access the network services provided by the application server in the wireless network (1000). At S906, the method includes authenticating, by the NF entity, least one ID of the UE (110) before providing the access to the service request. At S908, the method includes verifying, by the NF entity, the mapping between service specific identifier in the service request with already authenticated ID of the UE to allow access to the network service provided by the application server in the wireless network (1000).

Figure 10:
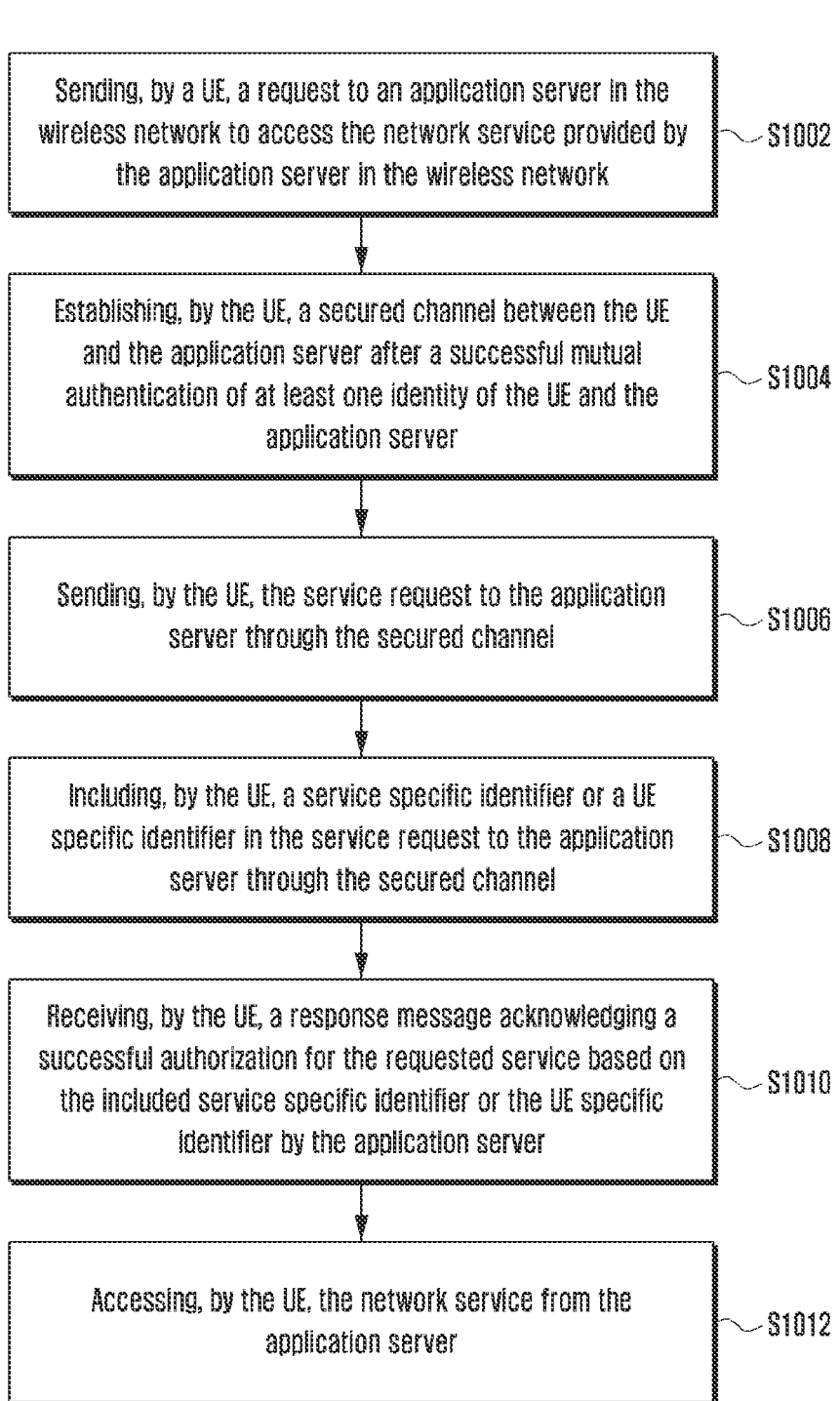
FIG. 10 illustrates a flow chart of a method, implemented by the UE, for application-specific authorization for network services in the wireless network according to the embodiments as disclosed herein.

FIG. 10 illustrates a flow chart (S1000) of a method, implemented by the UE (110), for application-specific authorization for network services in the wireless network (1000), according to the embodiments as disclosed herein.

The operations (S1002-S1012) may be handled by the application-specific authorization controller (740).

At S1002, the method includes sending the request to the application server in the wireless network (1000) to access the network service provided by the application server in the wireless network (1000). At S1004, the method includes establishing the secured channel between the UE (110) and the application server after the successful mutual authentication of at least one identity of the UE (110) and the application server. At S1006, the method includes sending the service request to the application server through the secured channel. At S1008, the method includes including the service specific identifier or the UE specific identifier in the service request to the application server through the secured channel. At S1010, the method includes receiving the response message acknowledging a successful authorization for the requested service based on the included service specific identifier or the UE specific identifier by the application server. At S1012, the method includes accessing the network service from the application server.

Figure 11:
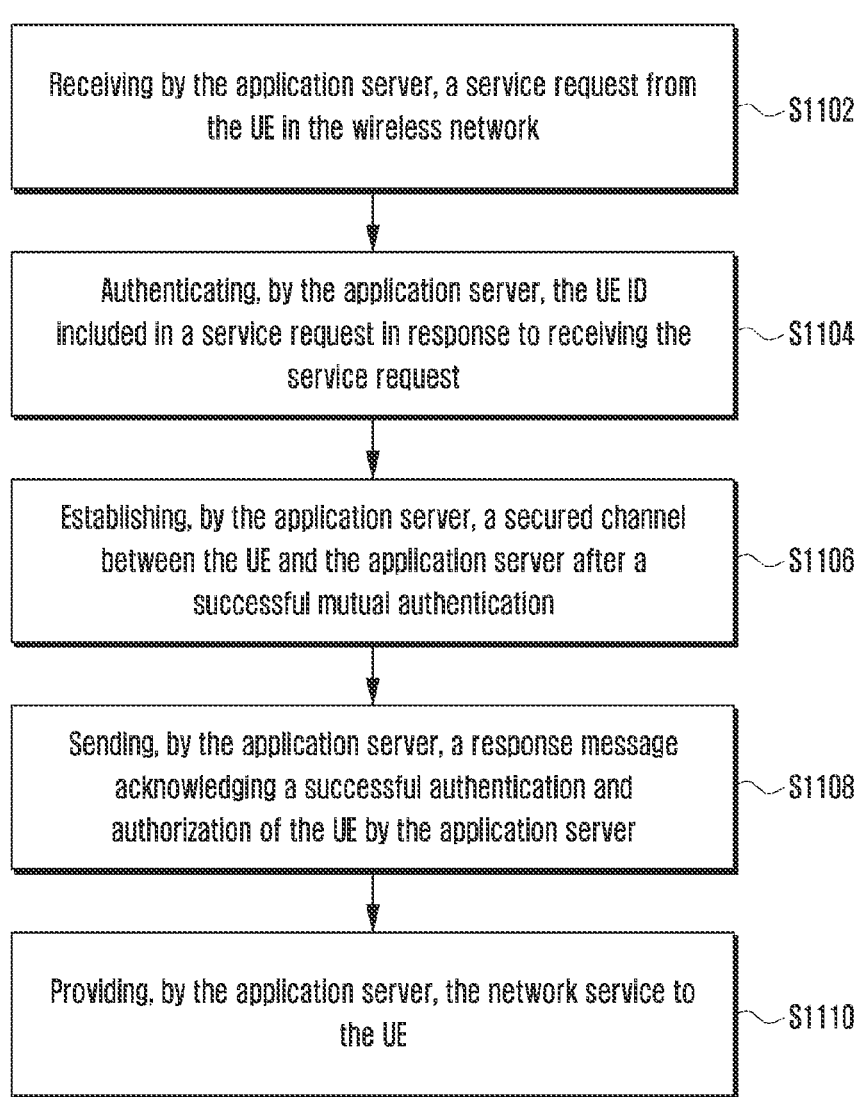
FIG. 11 illustrates a flow chart of a method, implemented by the application server (e.g., edge server or the MSGin5G server), for application-specific authorization for network services in the wireless network according to the embodiments as disclosed herein.

FIG. 11 illustrates a flow chart (S1100) of a method, implemented by the application server (e.g., edge server (210) or the MSGin5G server (200)), for application-specific authorization for network services in the wireless network (1000), according to the embodiments as disclosed herein. The operations (S1102-S1110) may be handled by the application-specific authorization controller (840).

At S1102, the method includes receiving the service request from the UE (110) in the wireless network. At S1104, the method includes authenticating the UE ID included in the service request in response to receiving the service request. At Si 106, the method includes establishing the secured channel between the UE (110) and the application server after the successful mutual authentication. At Si 108, the method includes sending the response message acknowledging the successful authentication and authorization of the UE (110) by the application server. At S1110, the method includes providing the network service to the UE (110).

Figure 12:
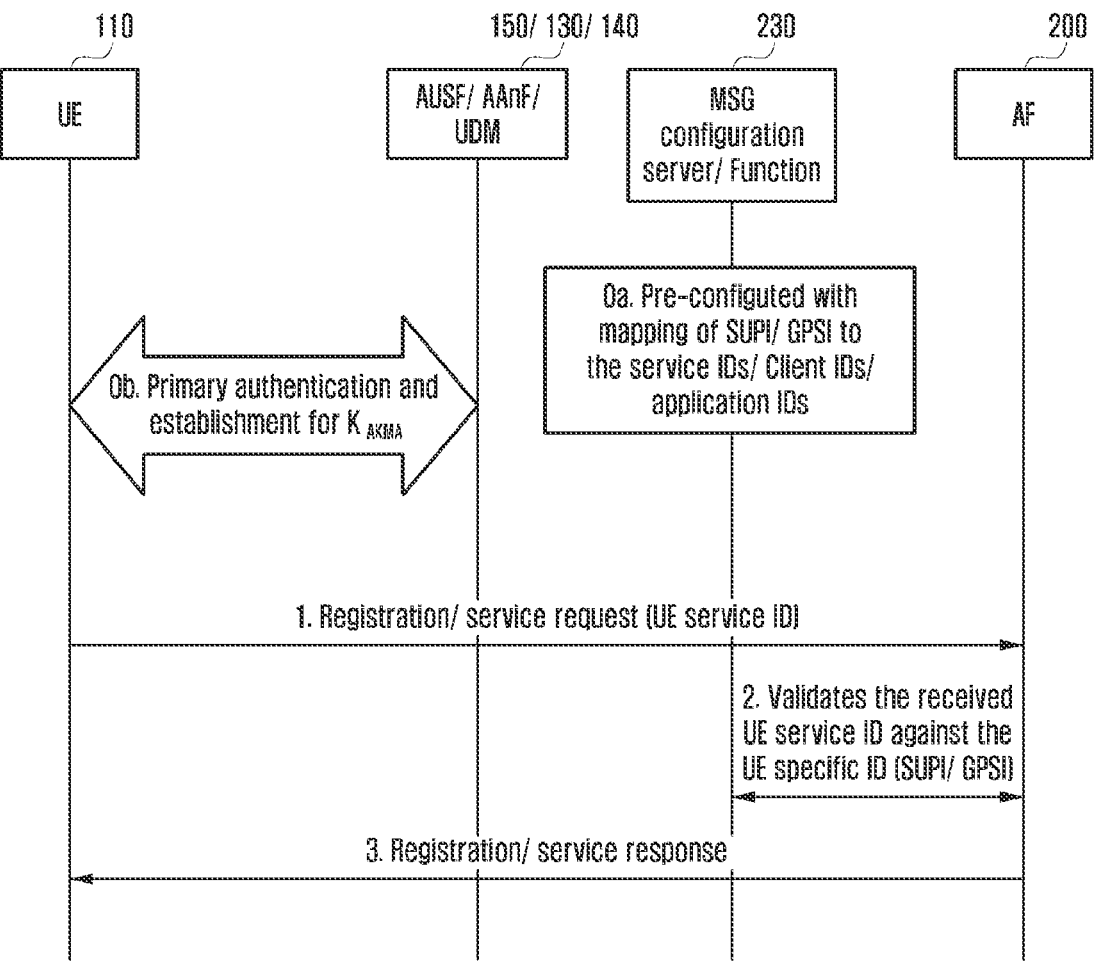
FIG. 12 illustrates a sequence flow diagram of a method, implemented by the MSGin5G server or the edge server, for application-specific authorization for network services in the wireless network according to the embodiments as disclosed herein.

FIG. 12 illustrates a sequence flow diagram of a method, implemented by the MSGin5G server or the edge server, for application-specific authorization for network services in the wireless network, according to the embodiments as disclosed herein.

When MSGin5G service is used with SEAL, the application architecture described in TS 23.554 is followed. In this case, authorization of the MSGin5G UE by the MSGin5G server is performed by validating the association between the UE service ID and UE ID (SUPI/GPSI). The UE service ID is acquired via the MSGin5G registration request. The configuration management server or MSGin5G configuration function maintains association of the assigned UE service ID with the UE ID. The MSGin5G server retrieves the association from the configuration management server or MSGin5G configuration function using the UE ID received from the AAnF and verifies whether the UE service ID received in the registration request message is associated with the UE ID in the retrieved association information.

In case of EDGE service, authorization of the edge enabler client (EEC) by the edge configuration server (ECS) or edge enabler server (EES) is performed by validating the association between the EEC ID and UE ID (SUPI/GPSI). The EEC ID is acquired via session establishment request and/or registration request. The authorization server maintains association of the EEC ID(s) with the UE IDs. The ECS or EES retrieves the association from the authorization server using the UE ID received from the AAnF and verifies whether the EEC ID received in the registration request message is associated with the authenticated UE ID in the retrieved association information. In an embodiment, the association of the IDs are maintained at the AF itself. The AF being ECS and/or EES.

The various actions, acts, blocks, steps, or the like in the flow charts (S900-S1100) may be performed in the order presented, in a different order or simultaneously. Further, in some embodiments, some of the actions, acts, blocks, steps, or the like may be omitted, added, modified, skipped, or the like without departing from the scope of the present disclosure.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method performed by a message service within a $5^{th}$ generation system (MSGin5G) server, the method comprises:

receiving, from a terminal, a registration request message including a terminal service identifier (ID);

receiving, from an authentication and key management for applications (AKMA) anchor function (AAnF) entity, a terminal ID that is used for retrieving association information of the terminal;

retrieving, from a configuration management server or an MSGin5G configuration function, the association information of the terminal based on the received terminal ID; and verifying whether the terminal service ID included in the registration request message is associated with the terminal ID included in the retrieved association information.

2. The method of claim 1, further comprises comprising:

providing, to the terminal, an access for a service based on a result of the verification.

3. The method of claim 1, wherein the association information of the terminal is retrieved based on the terminal ID received from the AAnF entity.

4. The method of claim 1, wherein verifying comprises:

verifying whether the terminal service ID included in the registration request message is associated with the terminal ID included in the retrieved association information.

5. The method of claim 1, wherein the terminal ID comprises a subscription permanent identifier (SUPI) or a generic public subscription identifier (GPSI).

6. The method of claim 1, further comprising performing an authorization operation for the terminal by retrieving an association between the terminal service ID and the terminal ID, wherein the terminal is an MSGin5G terminal.

7. The method of claim 1, wherein an association between the terminal service ID and the terminal ID is maintained by the configuration management server or the MSGin5G configuration function.

8. A message service within a 5<sup>th</sup> generation system (MSGin5G) server, the MSGin5G server comprises:

a transceiver; and at least one processor operably coupled to the transceiver, the at least one processor configured to:

receive, from a terminal via the transceiver, a registration request message including a terminal service identifier (ID), receive, from an authentication and key management for applications (AKMA) anchor function (AAnF) entity via the transceiver, a terminal ID that is used for retrieving obtaining association information of the terminal, retrieve, from a configuration management server or an MSGin5G configuration function via the transceiver, the association information of the terminal based on the received terminal ID, and verify whether the terminal service ID included in the registration request message is associated with the terminal ID included in the retrieved association information.

9. The MSGin5G server of claim 8, wherein the at least one processor is further configured to:

provide, to the terminal, an access for a service based on a result of the verification.

10. The MSGin5G server of claim 8, wherein the association information of the terminal is retrieved based on the terminal ID received from the AAnF entity.

11. The MSGin5G server of claim 8, wherein the at least one processor is further configured to:

verify whether the terminal service ID included in the registration request message is associated with the terminal ID included in the retrieved association information.

12. The MSGin5G server of claim 8, wherein the terminal ID comprises a subscription permanent identifier (SUPI) or a generic public subscription identifier (GPSI).

13. The MSGin5G server of claim 8, wherein the at least one processor is further configured to perform an authorization operation for the terminal by retrieving an association between the terminal service ID and the terminal ID, and wherein the terminal is an MSGin5G terminal.

14. The MSGin5G server of claim 8, wherein an association between the terminal service ID and the terminal ID is maintained by the configuration management server or the MSGin5G configuration function.

15. A method performed by a terminal, the method comprises:

transmitting, to a message service within a 5<sup>th</sup> generation system (MSGin5G) server, a registration request message including a terminal service identifier (ID); and receiving, from the MSGin5G server, a response message including information indicating whether an access to a service is provided, wherein a terminal ID is transmitted from an authentication and key management for applications (AKMA) anchor function (AAnF) entity to the MSGin5G server, and the terminal ID is used for retrieving association information of the terminal, wherein the association information of the terminal is retrieved from a configuration management server or an MSGin5G configuration function based on the terminal ID, and wherein whether the terminal service ID included in the registration request message is associated with the terminal ID included in the retrieved association information is verified.

16. The method of claim 15, wherein the access to the service is provided based on a result of the verification, wherein the association information of the terminal is retrieved based on the terminal ID received from the AAnF entity, wherein whether the terminal service ID included in the registration request message is associated with the terminal ID included in the retrieved association information is verified, and wherein the terminal ID comprises a subscription permanent identifier (SUPI) or a generic public subscription identifier (GPSI).

17. The method of claim 15, wherein an association between the terminal service ID and the terminal ID is maintained by the configuration management server or the MSGin5G configuration function.

18. A terminal, the terminal comprises:

a transceiver; and at least one processor operably coupled to the transceiver, the at least one processor configured to:

transmit, to a message service within a 5<sup>th</sup> generation system (MSGin5G) an server via the transceiver, a registration request message including a terminal service identifier (ID); and receive, from the MSGin5G server via the transceiver, a response message including information indicating whether an access to a service is provided, wherein a terminal ID is transmitted from an authentication and key management for applications (AKMA) anchor function (AAnF) entity to the MSGin5G server, the terminal ID being used for retrieving association information of the terminal, wherein the association information of the terminal is retrieved from a configuration management server or an MSGin5G configuration function based on the terminal ID, and wherein whether the terminal service ID included in the registration request message is associated with the terminal ID included in the retrieved association information is verified.

19. The terminal of claim 18, wherein the access to the service is provided based on a result of the verification, wherein the association information of the terminal is retrieved based on the terminal ID received from the AAnF entity, wherein whether the terminal service ID included in the registration request message is associated with the terminal ID included in the retrieved association information is verified, and wherein the terminal ID comprises a subscription permanent identifier (SUPI) or a generic public subscription identifier (GPSI).

20. The terminal of claim 18, wherein an association between the terminal service ID and the terminal ID is maintained by the configuration management server or the MSGin5G configuration function.

\* \* \* \* \*